(12) United States Patent
Sakai (10) Patent No.: US 10,474,020 B2
(45) Date of Patent: Nov. 12, 2019

(54) DISPLAY APPARATUS AND METHOD FOR CONTROLLING DISPLAY APPARATUS TO DISPLAY AN IMAGE WITH AN ORIENTATION BASED ON A USER'S POSITION

(71) Applicant: SEIKO EPSON CORPORATION, Tokyo (JP)

(72) Inventor: Toshiyuki Sakai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/991,233

(22) Filed: May 29, 2018

(65) Prior Publication Data

US 2018/0348615 A1  Dec. 6, 2018

(30) Foreign Application Priority Data

Jun. 2, 2017 (JP) ................................ 2017-109803

(51) Int. Cl.
| | | |
|---|---|---|
| *G03B 21/20* | (2006.01) | |
| *G06F 3/0482* | (2013.01) | |
| *G02B 27/09* | (2006.01) | |
| *G03B 17/54* | (2006.01) | |
| *H04N 9/31* | (2006.01) | |
| *G03B 21/14* | (2006.01) | |

(52) U.S. Cl.
CPC ....... *G03B 21/206* (2013.01); *G02B 27/0955* (2013.01); *G03B 17/54* (2013.01); *G03B 21/2033* (2013.01); *G03B 21/2066* (2013.01); *G06F 3/0482* (2013.01); *H04N 9/3185* (2013.01); *H04N 9/3194* (2013.01); *G03B 21/142* (2013.01)

(58) Field of Classification Search
CPC .............. G03B 21/206; G03B 21/2033; G03B 21/2066; G02B 27/0955; G06F 3/0482
See application file for complete search history.

(56) References Cited

U.S. PATENT DOCUMENTS

| | | | |
|---|---|---|---|
| 2011/0188008 A1 | 8/2011 | Maeda et al. | |
| 2018/0091772 A1* | 3/2018 | Han | ...................... A61B 5/6887 |
| 2018/0164981 A1* | 6/2018 | Park | .......................... G06F 3/14 |

FOREIGN PATENT DOCUMENTS

| | | |
|---|---|---|
| JP | 2011-180260 A | 9/2011 |
| JP | 2014-063230 A | 4/2014 |
| JP | 2015-212892 A | 11/2015 |
| JP | 2016-008999 A | 1/2016 |
| JP | 2016-046677 A | 4/2016 |
| JP | 2016-194792 A | 11/2016 |

\* cited by examiner

*Primary Examiner* — Sultan Chowdhury
*Assistant Examiner* — Magda Cruz
(74) *Attorney, Agent, or Firm* — Oliff PLC (57) ABSTRACT

A projector includes a display section configured to display an image on a display target object, a detection section configured to detect the position of a user, and a control section configured to control the orientation of the image in accordance with the direction from the position of the user toward a reference point.

17 Claims, 6 Drawing Sheets

DISPLAY APPARATUS AND METHOD FOR CONTROLLING DISPLAY APPARATUS TO DISPLAY AN IMAGE WITH AN ORIENTATION BASED ON A USER'S POSITION

BACKGROUND

1. Technical Field

The present invention relates to a display apparatus and a method for controlling the display apparatus.

2. Related Art

JP-A-2014-63230 describes a display system that sets the orientation of a display image in accordance with the position of a user. The display system includes a table that incorporates a display section, and a sensor that detects the user is provided at each edge of the table. When any of the sensors detects the user, the display system sets the orientation of the display image in such away that the display image is displayed in the erect direction in a case where the display section is viewed from the side facing the edge where the sensor is provided.

In the display system described in JP-A-2014-63230, the orientation of the display image remains unchanged even when the user faces any position on an edge of the table. That is, the display system does not control the orientation of the display image on a user's position basis in the exact sense. The display image is therefore possibly so oriented as not to be readily viewed by the user depending on the position of the user.

SUMMARY

An advantage of some aspects of the invention is to provide a technology that allows an image to be so oriented as to be readily viewed by a user.

A display apparatus according to an aspect of the invention includes a display section configured to display an image on a display target object and at least one processor configured to detects a position of a user and controls orientation of the image in accordance with a direction from the position of the user toward a reference point.

According to the aspect described above, the orientation of the image is controlled on a user's position basis. The image can therefore be so oriented as to be readily viewed by the user.

In the display apparatus according to the aspect described above, it is desirable that the reference point is a point present on the display target object.

According to the aspect with this configuration, the reference point can be set as long as the display target object is present, and the orientation of the image can be controlled in accordance with the relationship between the reference point present on the display target object and the position of the user.

In the display apparatus according to the aspect described above, it is desirable that the reference point is a point closest to the user out of points present on the display target object.

The user, when viewing the image displayed on the display target object, is likely to face the point closest to the user out of the points on the display target object.

According to the aspect with this configuration, the orientation of the image is controlled in accordance with the direction from the user toward the point closest to the user out of the points on the display target object. The orientation of the image therefore coincides with the orientation of the user with a high probability, whereby the image can be so oriented as to be readily viewed by the user.

In the display apparatus according to the aspect described above, it is desirable that the reference point is a geometric center of the display target object.

According to the aspect with this configuration, in a case where a plurality of users are present, the images for the users can be oriented toward one common point.

In the display apparatus according to the aspect described above, it is desirable that when the at least one processor detects positions of first and second users as the user, the at least one processor controls the orientation of the image in accordance with a direction from a position between the position of the first user and the position of the second user toward the reference point in a case where a distance between the position of the first user and the position of the second user is smaller than a threshold.

According to the aspect with this configuration, in a case where the first and second users are close to each other, the image can be so oriented as to be readily viewed by both the first and second users.

A display apparatus according to another aspect of the invention includes a display section configured to display an image on a display target object, a detection section configured to detect a position of a user, and a control section configured to control orientation of the image in accordance with a direction from the position of the user toward a reference point.

According to the aspect described above, the orientation of the image is controlled on a user's position basis. The image can therefore be so oriented as to be readily viewed by the user.

In the display apparatus according to the aspect described above, it is desirable that the reference point is a point present on the display target object.

According to the aspect with this configuration, the reference point can be set as long as the display target object is present, and the orientation of the image can be controlled in accordance with the relationship between the reference point present on the display target object and the position of the user.

In the display apparatus according to the aspect described above, it is desirable that the reference point is a point closest to the user out of points present on the display target object.

The user, when viewing the image displayed on the display target object, is likely to face the point closest to the user out of the points on the display target object.

According to the aspect with this configuration, the orientation of the image is controlled in accordance with the direction from the user toward the point closest to the user out of the points on the display target object. The orientation of the image therefore coincides with the orientation of the user with a high probability, whereby the image can be so oriented as to be readily viewed by the user.

In the display apparatus according to the aspect described above, it is desirable that the reference point is a geometric center of the display target object.

According to the aspect with this configuration, in a case where a plurality of users are present, the images for the users can be oriented toward one common point.

In the display apparatus according to the aspect described above, it is desirable that when the detection section detects positions of first and second users as the user, the control section controls the orientation of the image in accordance with a direction from a position between the position of the first user and the position of the second user toward the reference point in a case where a distance between the position of the first user and the position of the second user is smaller than a threshold.

According to the aspect with this configuration, in a case where the first and second users are close to each other, the image can be so oriented as to be readily viewed by both the first and second users.

A method for controlling a projector according to another aspect of the invention is a method for controlling a display apparatus that displays an image on a display target object, the method including detecting a position of a user and controlling orientation of the image in accordance with a direction from the position of the user toward a reference point.

According to the aspect described above, the orientation of the image is controlled on a user's position basis. The image can therefore be so oriented as to be readily viewed by the user.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments according to the invention will be described below with reference to the drawings. In the drawings, the dimension and scale of each portion differ from actual values as appropriate. Further, since the embodiments described below are preferable specific examples of the invention, a variety of technically preferable restrictions are imposed on the embodiments. The scope of the invention is, however, not limited to the restricted forms unless otherwise particularly stated in the following description that a restriction is imposed on the invention.

First Embodiment

Figure 1:
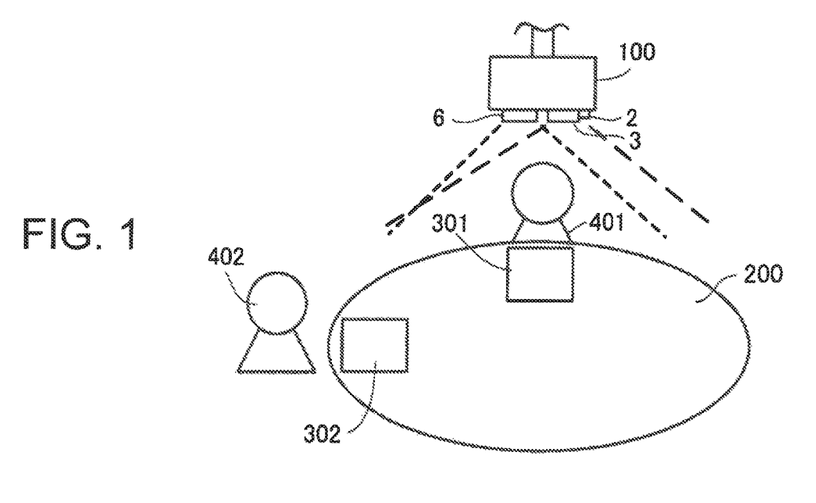
FIG. 1 shows a projector according to a first embodiment.
Figure 2:
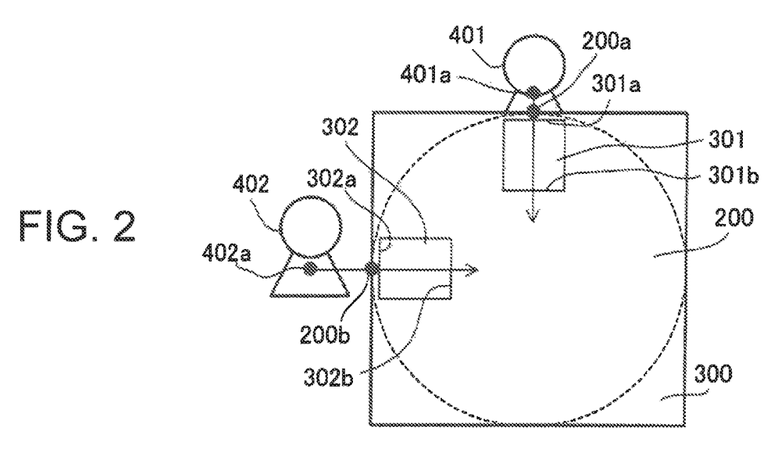
FIG. 2 shows an example of a projection image.

FIG. 1 shows a projector 100 according to a first embodiment. The projector 100 is an example of a display apparatus. FIG. 2 shows an example of a projection image 300 projected from the projector 100 onto a display target object 200. The display target object 200 is, for example, a circular table.

The projection image 300 includes an image for a user, for example, a UI (user interface) image that allows the user to operate the projector 100. The UI image is displayed on a user basis. The UI image is, for example, a menu image that allows the user to select a dish in a restaurant. The UI image is not limited to the menu image and can be changed as appropriate.

In FIGS. 1 and 2, a UI image 301 is displayed for a user 401, and a UI image 302 is displayed for a user 402. That is, the UI image 301 corresponds to the user 401, and the UI image 302 corresponds to the user 402. The user 401 is an example of a first user. The user 402 is an example of a second user.

The projector 100 includes an infrared camera 2, a visible light camera 3, and a projection section 6.

The infrared camera 2 includes an infrared light filter that transmits only infrared light. The infrared camera 2 captures an image of an image capturing area containing the display target object 200 and an area therearound via the infrared light filter to produce a first captured image.

The visible light camera 3 captures an image of the image capturing area to produce a second captured image, as does the infrared camera 2. The visible light camera 3 may capture an image of the image capturing area via a visible light filter that transmits only visible light.

The projector 100 uses the first captured image to detect a position 401a of the user 401 and a position 402a of the user 402. The projector 100 uses the position 401a and the second captured image to detect a point 200a closest to the user 401 out of the points on the display target object 200. The projector 100 uses the position 402a and the second captured image to detect a point 200b closest to the user 402 out of the points on the display target object 200.

In the following description, the point 200a is also referred to as a "first reference point 200a," and the point 200b is also referred to as a "second reference point 200b." The first reference point 200a and the second reference point 200b are each an example of a reference point. The first reference point 200a and the second reference point 200b are also each an example of a point present on a display target object.

The projector 100 controls the orientation of the UI image 301 in accordance with the orientation defined by the direction from the position 401a toward the first reference point 200a (hereinafter referred to as "first orientation"). For example, the projector 100 sets the orientation of the UI image 301 in the projection image 300 in such a way that the orientation defined by the direction from a lower edge 301a of the UI image 301 toward an upper edge 301b thereof coincides with the first orientation.

The projector 100 subsequently sets the position of the UI image 301 in the projection image 300 in such a way that the UI image 301 is projected in the set orientation on the display target object 200.

The projector 100 further controls the orientation of the UI image 302 in accordance with the orientation defined by the direction from the position 402a toward the second reference point 200b (hereinafter referred to as "second orientation"). For example, the projector 100 sets the orientation of the UI image 302 in the projection image 300 in such a way that the orientation defined by the direction from a lower edge 302a of the UI image 302 toward an upper edge 302b thereof coincides with the second orientation.

The projector 100 subsequently sets the position of the UI image 302 in the projection image 300 in such a way that the UI image 302 is projected in the set orientation on the display target object 200.

The projector 100 displays the projection image 300 representing the UI image 301 in the set orientation and position and representing the UI image 302 in the set orientation and position by projecting the projection image 300 from the projection section 6 onto the display target object 200.

Figure 3:
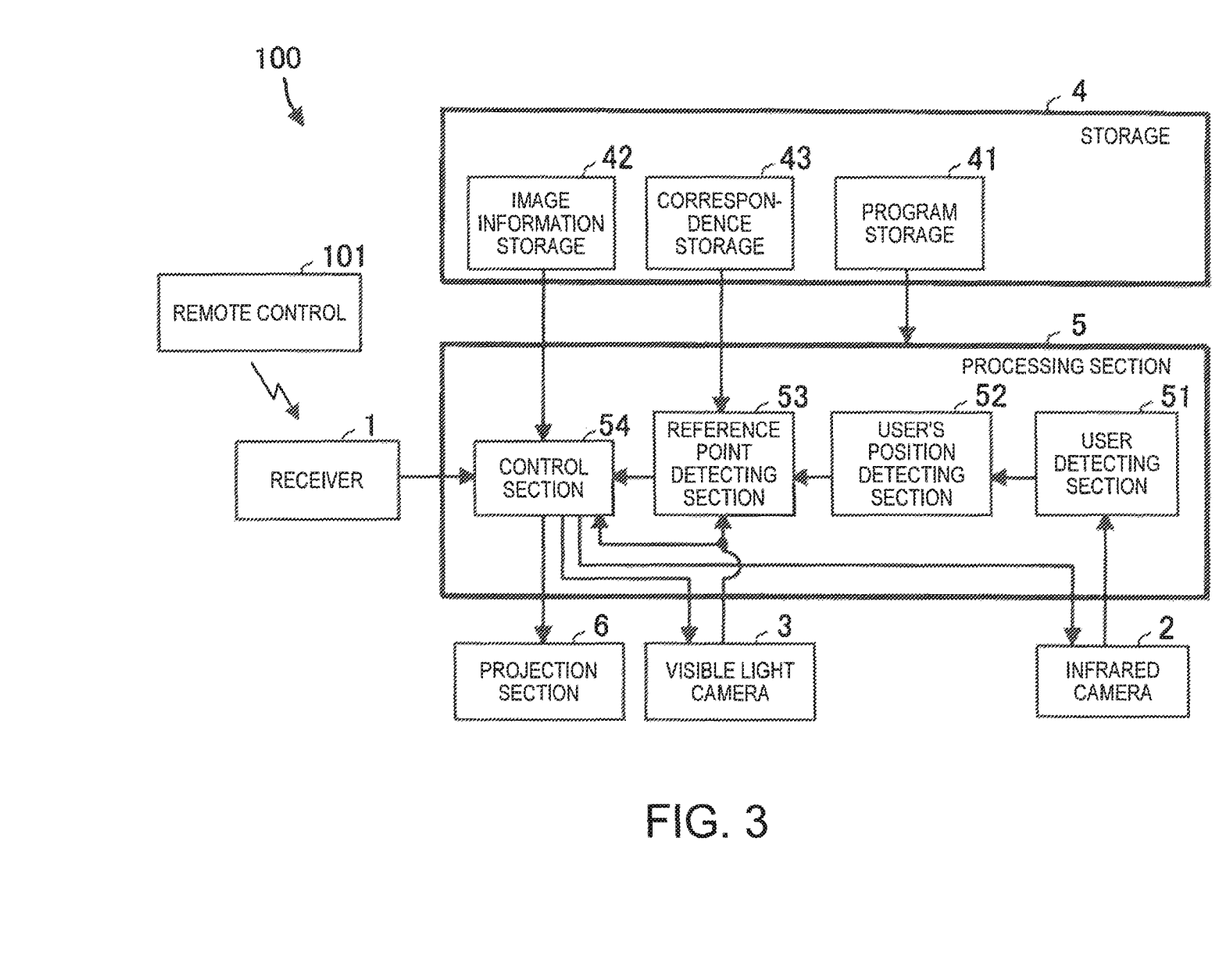
FIG. 3 shows an example of the projector.

FIG. 3 shows an example of the projector 100.

The projector 100 includes a receiver 1, the infrared camera 2, the visible light camera 3, a storage 4, a processing section 5, and the projection section 6. The projector 100 is controlled, for example, by a remote control 101.

The remote control 101 includes a variety of operation buttons or operation keys, a touch panel, or any other component that accepts the user's input. The remote control 101 transmits information according to the user's input.

The receiver 1 receives the information transmitted by the remote control 101 and outputs the information to the processing section 5 (control section 54).

The infrared camera 2 captures an image of the image capturing area to produce the first captured image, as described above. The infrared camera 2 includes the infrared light filter described above and an imaging device that captures infrared light having passed through the infrared light filter. The imaging device is, for example, a CCD (charge coupled device) imaging device or a CMOS (complementary metal oxide semiconductor) imaging device.

The visible light camera 3 captures an image of the image capturing area to produce the second captured image, as described above. The visible light camera 3 includes a CCD imaging device or a CMOS imaging device.

The storage 4 is a computer readable recording medium. The storage 4 is, for example, a flash memory. The storage 4 includes a program storage 41, an image information storage 42, and a correspondence storage 43. The program storage 41 stores a control program executed by the processing section 5. The image information storage 42 stores, for example, UI image information representing a UI image. The correspondence storage 43 stores correspondence information representing the correspondence between a position in the first captured image and a position in the second captured image.

The processing section 5 is, for example, a computer, such as a CPU (central processing unit). The processing section 5 may be formed of one or more processors. The processing section 5 reads and executes the control program stored in the program storage 41 to achieve a user detecting section 51, a user's position detecting section 52, a reference point detecting section 53, and a control section 54. The one or more processors that form the processing section 5 may achieve the user detecting section 51, the user's position detecting section 52, the reference point detecting section 53, and the control section 54.

The user detecting section 51 detects a user present around the display target object 200 based on the first captured image. Having detected a user present around the display target object 200, the user detecting section 51 outputs the first captured image to the user's position detecting section 52.

The user's position detecting section 52 is an example of a detecting section. The user's position detecting section 52 detects the position of the user based on the first captured image. In the present embodiment, the user's position detecting section 52 detects a geometric center (position of geometrical center) of the user as the position of the user based on the first captured image. In a case where a plurality of users are detected, the user's position detecting section 52 detects the geometric center of each of the users based on the first captured image. The user's position detecting section 52 outputs the result of the detection of the position of the user to the reference point detecting section 53.

Based on the second captured image and the correspondence information stored in the correspondence storage 43, the reference point detecting section 53 detects a reference point corresponding to the user's position detected by the user's position detecting section 52.

In the present embodiment, the reference point detecting section 53 detects the reference position as follows.

The reference point detecting section 53 uses the correspondence information to identify the position on the second captured image that corresponds to the user's position detected by the user's position detecting section 52 (hereinafter also referred to as "corresponding position").

The reference point detecting section 53 subsequently detects, out of the points on the display target object 200 contained in the second captured image, the point closest to the corresponding position as the reference point corresponding to the position of the user. In a case where the user's position detecting section 52 detects the positions of a plurality of users, the reference point detecting section 53 detects a reference point corresponding to the position of each of the users.

The reference point detecting section 53 relates the reference point corresponding to the position of each of the users to the position of the user and outputs the positions of the users and the reference points related to each other to the control section 54.

The control section 54 controls the projector 100. The control section 54 controls the projector 100 in accordance, for example, with the information received by the receiver 1 from the remote control 101.

The control section 54 sets the orientation of a UI image in the projection image 300 based on the positional relationship between the position of the user and the reference point. The control section 54 identifies the area where the display target object 200 is present based on the second captured image. The control section 54 sets the position of the UI image in the projection image 300 in such a way that the UI image is projected in the set orientation on the display target object 200.

The control section 54 disposes the UI image in the set orientation and position in the projection image 300 in which no UI image is disposed. The control section 54 causes the projection section 6 to project the projection image 300 in which the UI image is disposed. In the present embodiment, the control section 54 produces an image signal according to the projection image 300 in which the UI image is disposed and outputs the image signal to the projection section 6 to cause the projection section 6 to project the projection image 300.

The projection section 6 is an example of a display section. The projection section 6 receives the image signal from the control section 54 and displays the projection image 300 by projecting the projection image 300 onto the display target object 200 in accordance with the image signal.

Figure 4:
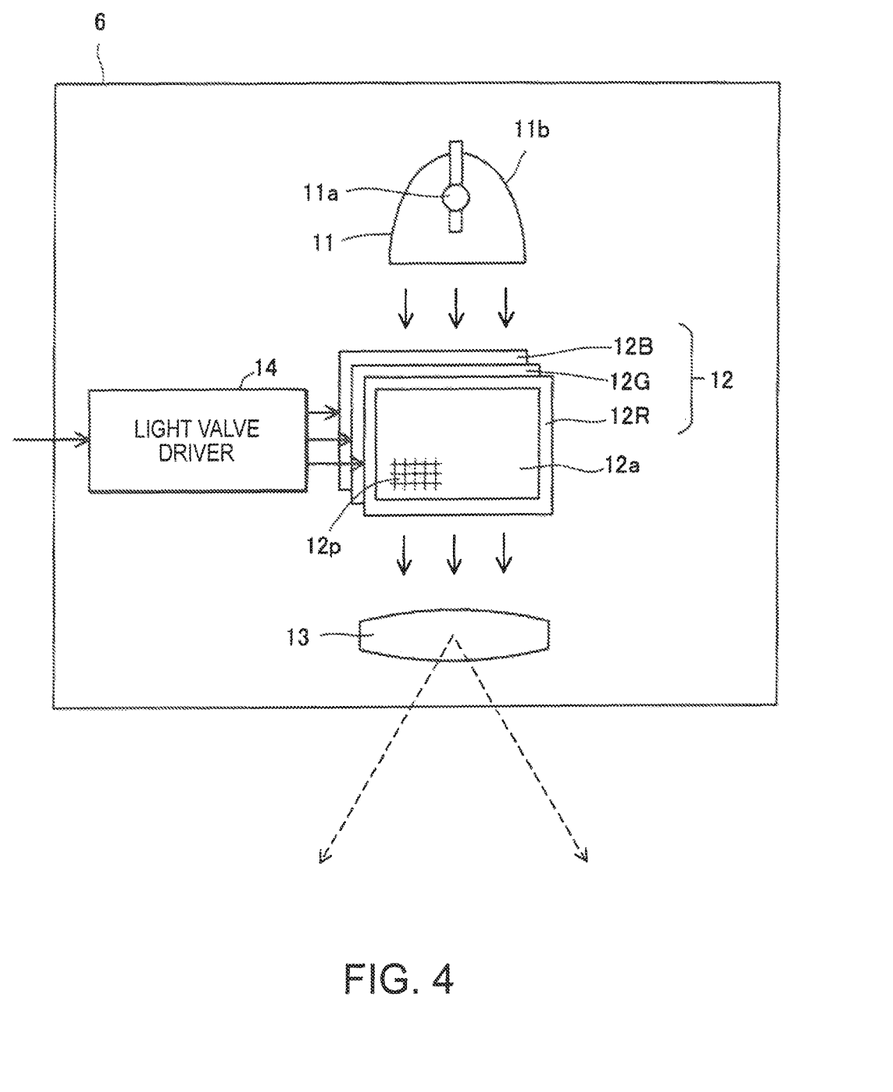
FIG. 4 shows an example of a projection section.

FIG. 4 shows an example of the projection section 6. The projection section 6 includes a light source 11, three liquid crystal light valves 12 (12R, 12G, and 12B), which are each an example of a light modulator, a projection lens 13, which is an example of a projection system, a light valve driver 14, and other components. The projection section 6 modulates light outputted from the light source 11 in the liquid crystal light valves 12 to form projection images (image light) and enlarges and projects the projection images via the projection lens 13.

The light source 11 includes a light source section 11a, which is formed, for example, of a xenon lamp, an ultrahigh-pressure mercury lamp, an LED (light emitting diode), or a laser light source, and a reflector 11b, which reduces variation in the direction of light emitted by the light source section 11a. The light outputted from the light source 11 passes through an optical integrator system that is not shown, where variation in the luminance distribution of the light is reduced, and the resultant light is then separated by a color separation system that is not shown into red (R), green (G), and blue (B) light components, which are the three primary colors of light. The RGB light components are incident on the liquid crystal light valves 12R, 12G, and 12B, respectively.

The liquid crystal light valves 12 are each formed, for example, of a liquid crystal panel in which a liquid crystal material is encapsulated between a pair of transparent substrates. The liquid crystal light valves 12 each have a rectangular pixel area 12a formed of a plurality of pixels 12p arranged in a matrix. In each of the liquid crystal light valves 12, drive voltage is applicable to the liquid crystal material for each of the pixels 12p. The light valve driver 14 applies drive voltage according to the image signal inputted from the control section 54 to each of the pixels 12p, and the pixel 12p has light transmittance set in accordance with the image signal. The light outputted from the light source 11 is therefore modulated when passing through the pixel areas 12a to form images according to the image signal on a color basis.

The color images are combined with one another by a light combining system, which is not shown, for each of the pixels 12p to produce projection image light (projection image) that is color image light (color image). The projection image light is enlarged and projected by the projection lens 13 onto the display target object 200.

When the user operates the UI image, the control section 54 detects the user's operation performed on the UI image based on the second captured image produced by the visible light camera 3 and carries out a process according to the result of the detection.

The action of the projector 100 will next be described.

Figure 5:
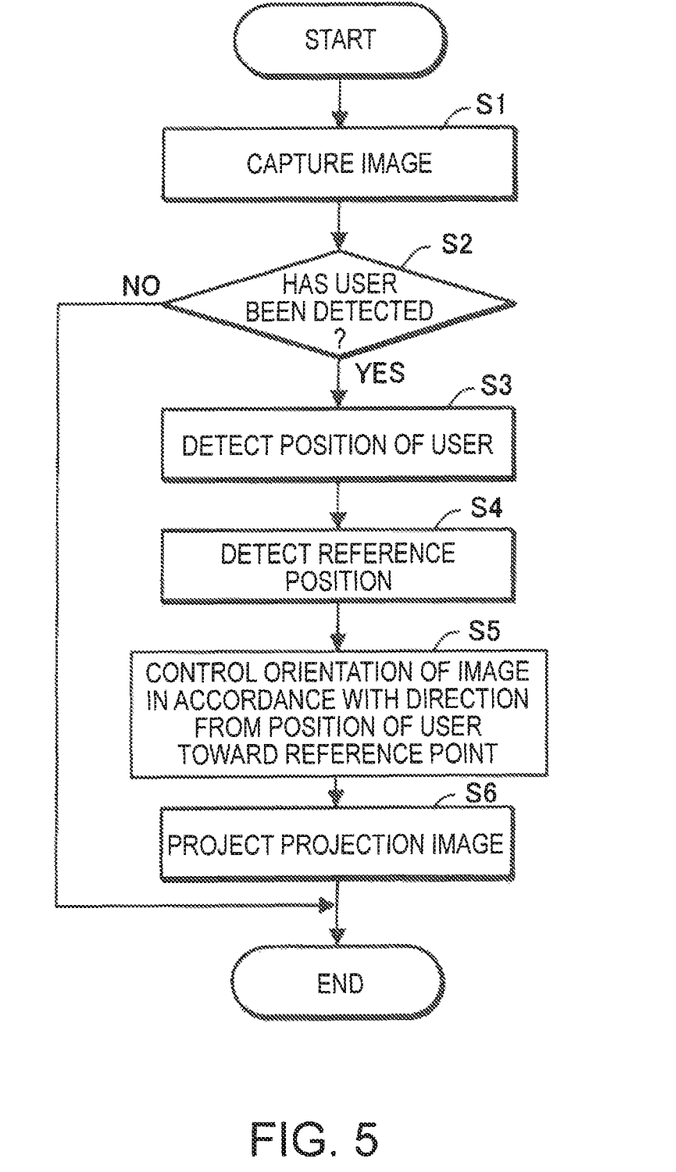
FIG. 5 is a flowchart for describing the action of the projector.

FIG. 5 is a flowchart for describing the action of the projector 100. The action shown in FIG. 5 is repeatedly performed, for example, when the user operates the remote control 101 to input an action start instruction.

The infrared camera 2, when it captures an image of the image capturing area to produce the first captured image, outputs the first captured image to the user detecting section 51, and the visible light camera 3, when it captures an image of the image capturing area to produce the second captured image, outputs the second captured image to the reference point detecting section 53 and the control section 54 (step S1).

The user detecting section 51 analyzes the first captured image to evaluate whether or not the first captured image contains a user. In a case where the first captured image contains a user, that is, when the user detecting section 51 detects a user (YES in step S2), the user detecting section 51 outputs the first captured image to the user's position detecting section 52.

Having received the first captured image, the user's position detecting section 52 detects the geometric center (position of geometric center) of the user as the position of the user based on the first captured image (step S3). In the case where the user's position detecting section 52 detects a plurality of users, the user's position detecting section 52 detects the geometrical center of each of the users. The user's position detecting section 52 outputs the position of the user to the reference point detecting section 53.

Having received the position of the user, the reference point detecting section 53 uses the second captured image and the correspondence information to detect the reference point corresponding to the position of the user (step S4). The reference point detecting section 53, when it receives the plurality of positions of the users, detects a reference point corresponding to the position of the user for each of the positions of the users. The reference point detecting section 53 relates the reference point corresponding to each of the positions of the users to the position of the user and outputs the positions of the users and the reference points related to each other to the control section 54.

The control section 54 controls the orientation of the UI image in the projection image 300 based on the positional relationship between the position of the user and the reference point corresponding to the position. Specifically, the control section 54 reads the UI image from the image information storage 42 and controls the orientation of the UI image in the projection image 300 in such a way that the direction from the position of the user toward the reference point corresponding to the position coincides with the orientation defined by the direction from the lower edge of the UI image toward the upper edge thereof (step S5).

For example, assume that the position 401a of the user 401, the first reference point 200a, the position 402 of the user 402, and the second reference point 200b are detected, as shown in FIG. 1.

In this case, the control section 54 sets the orientation of the UI image 301 in the projection image 300 in such a way that the orientation defined by the direction from the lower edge 301a of the UI image 301 toward the upper edge 301b thereof coincides with the first orientation (orientation defined by direction from position 401a toward first reference point 200a).

In this case, the control section 54 further sets the orientation of the UI image 302 in the projection image 300 in such a way that the orientation defined by the direction from the lower edge 302a of the UI image 302 toward the upper edge 302b thereof coincides with the second orientation (orientation defined by direction from position 402a toward second reference point 200b).

The control section 54 subsequently identifies the area where the display target object 200 is present based on the second captured image. The control section 54 subsequently sets the positions of the UI image 301 and the UI image 302 in the projection image 300 in such a way that the UI image 301 is projected in the set orientation on the display target object 200 and the UI image 302 is projected in the set orientation on the display target object 200.

The control section 54 subsequently produces an image signal according to the projection image 300 representing the UI image 301 in the set orientation and position and representing the UI image 302 in the set orientation and position and outputs the image signal to the projection section 6. The projection section 6 displays the projection image 300 according to the image signal received from the control section 54 by projecting the projection image 300 on the display target object 200 (step S6).

In step S2, in a case where the first captured image contains no user (NO in step S2), the process shown in FIG. 5 is terminated.

The projector 100 and the method for controlling the projector 100 according to the present embodiment control the orientation of a UI image on a user's position basis. The UI image can therefore be so oriented as to be readily viewed by the user.

Comparison of the present embodiment with Comparative Example thereof so configured that the orientation of the user is detected and the orientation of an image is controlled based on the result of the detection shows that the present embodiment allows the image to be so oriented as to be readily viewed by the user without the complicated process of detecting the orientation of the user.

Variations

The invention is not limited to the embodiment described above, and a variety of variations, for example, those that will be described below, are conceivable. Further, one or more variations arbitrarily selected from the following aspects of variations can be combined with one another as appropriate.

Variation 1

Figure 6:
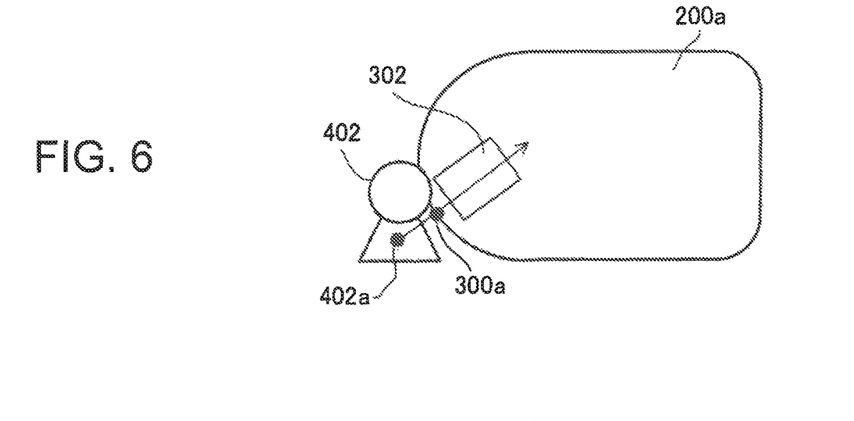
FIG. 6 shows another example of a display target object.

The display target object 200 is not limited to a circular table and can be changed as appropriate. For example, the table having the shape shown in FIG. 6 can be used as the display target object 200.

Variation 2

Figure 7:
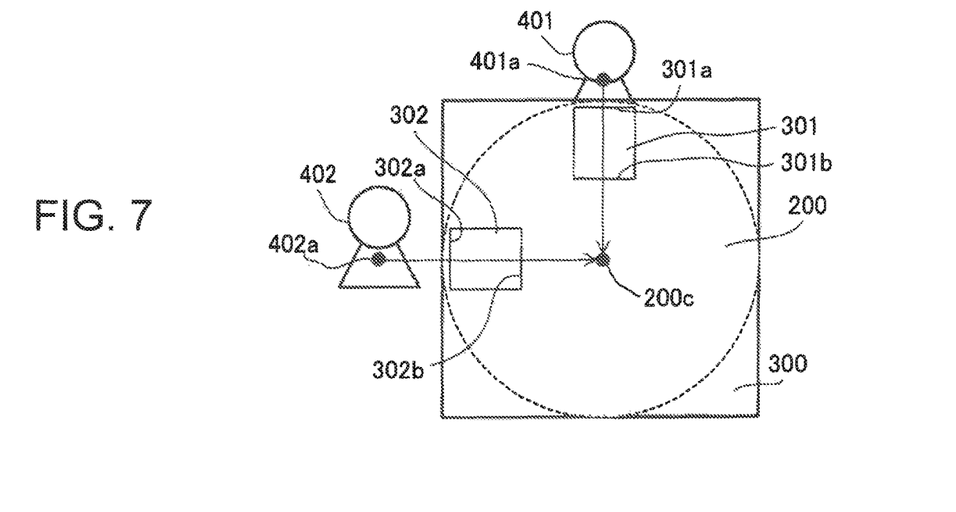
FIG. 7 shows an example in which the geometric center of the display target object is used as a reference point.

The reference point is not limited to the point closest to the user out of the points on the display target object 200. For example, the geometric center (position of geometric center) 200c of the display target object 200 may be used as the reference point.

Variation 3

Figure 8:
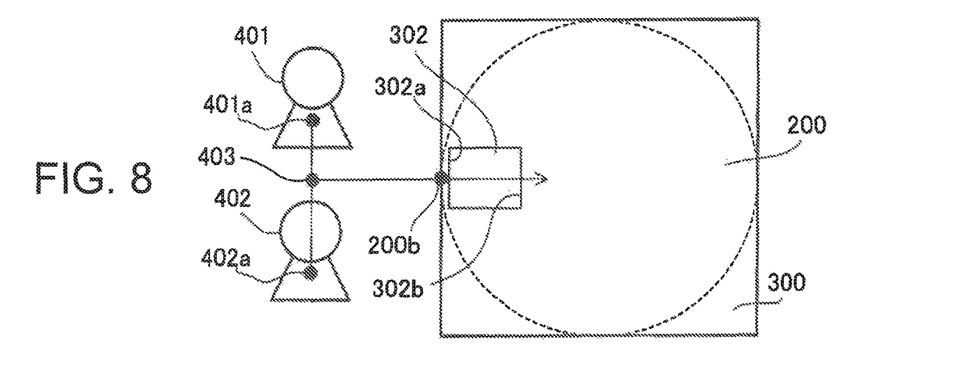
FIG. 8 shows an example in which the distance between two users is smaller than a threshold.

In a situation in which the user's position detecting section 52 detects the position 401a of the user 401 and the position 402a of the user 402, the control section 54 may control the orientation of a UI image in accordance with the orientation from a position 403 between the position 401a and the position 402a toward the reference point in a case where the distance between the position 401 and the position 402 is smaller than a threshold. In this case, the reference point may be the point closest to the position 403 out of the points on the display target object 200, the geometric center (position of geometric center) of the display target object 200, or any other point.

In this case, in a case where the user 401 and the user 402 view one UI image because the distance between the user 401 and the user 402 is small, as shown in FIG. 8, the UI image can be so oriented as to be readily viewed by both the user 401 and the user 402.

Variation 4

Figure 9:
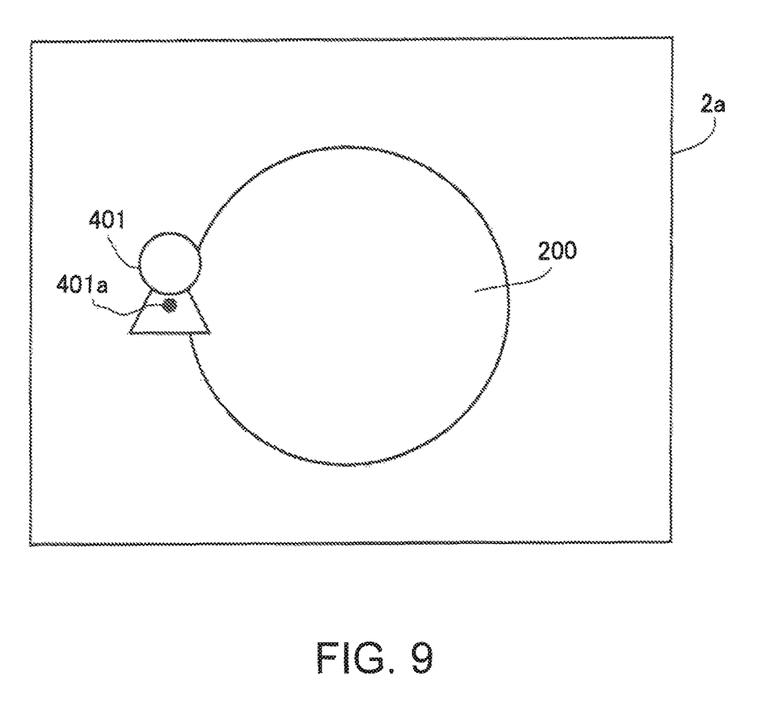
FIG. 9 shows a captured image in which a user and the display target object overlap with each other.

In a case where the user detecting section 51 further receives the second captured image, and analysis of the first and second captured images indicates that the user and the display target object 200 overlap with each other, as shown in FIG. 9, the user detecting section 51 may determine that the user has been detected.

Variation 5

The user detecting section 51 may detect an arm with which the user has performed operation on a UI image and determine the user's dominant hand based on the result of the detection. In this case, in a situation in which the image information storage 42 stores UI image information on a UI image for a right-handed person and UI image information on a UI image for a left-handed person, the control section 54 may read UI image information according to the result of the determination made by the user detecting section 51 and dispose the UI image indicated by the UI image information in the projection image 300.

Variation 6

The control section 54 may control the orientation of a UI image in such a way that the orientation defined by the direction from the lower edge of the UI image toward the upper edge thereof inclines by a predetermined angle with respect to the orientation defined by the direction from the position of the user toward the reference point Variation 7

The entirety or part of the elements achieved when the processing section 5 executes the program may be achieved by hardware formed, for example, of an FPGA (field programmable gate array), an ASIC (application specific IC), or any other electronic circuit or may be achieved by software and hardware that cooperate with each other.

Variation 8

The projection section 6 uses liquid crystal light valves as the light modulator, and the light modulator may not be formed of liquid crystal light valves and can be changed as appropriate. For example, the light modulator may instead be configured to use three reflective liquid crystal panels. The light modulator may still instead, for example, be configured to use one liquid crystal panel, three digital mirror devices (DMDs), or one digital mirror device. In the case where only one liquid crystal panel or DMD is used as the light modulator, no members corresponding to the color separation system and the light combining system are required. Further, a configuration including no liquid crystal panel or DMD but capable of modulating light emitted from a light source can be employed as the light modulator.

Variation 9

A projector is used as the display apparatus, but the display apparatus is not limited to a projector and can be changed as appropriate. For example, the display apparatus may be a direct-view display. In this case, the projection section 6 is replaced, for example, with a liquid crystal display or any other direct-view display section.

The entire disclosure of Japanese Patent Application No. 2017-109803, filed Jun. 2, 2017 is expressly incorporated by reference herein.

What is claimed is:

1. A display apparatus comprising:
   a display section configured to display an image on a display target object; and
   at least one processor configured to:
   detect a position of a user,
   determine a direction from the position of the user toward a reference point, and
   control orientation of the image in accordance with the determined direction,
   wherein the at least one processor is configured to determine a lower part and an upper part of the image, and control the orientation by aligning a direction from the lower part to the upper part with the direction from the position of the user toward the reference point, and
   the direction from the lower part to the upper part is in a plane parallel to the surface of the image.

2. The display apparatus according to claim 1, wherein the reference point is a point present on the display target object.

3. The display apparatus according to claim 2, wherein the reference point is a point closest to the user out of points present on the display target object.

4. The display apparatus according to claim 1, wherein the reference point is a geometric center of the display target object.

5. The display apparatus according to claim 1, wherein, when the there are two users including a first user and a second user, at least one processor detects positions of the first user and second user, the at least one processor controls the orientation of the image in accordance with a direction from a position between the position of the first user and the position of the second user toward the reference point in a case where a distance between the position of the first user and the position of the second user is smaller than a threshold.

6. The display apparatus according to claim 1, further comprising a camera which captures a captured image of an image capturing area containing the display target object,
   wherein the at least one processor detects a position of the reference point base on the captured image obtained from the camera.

7. The display apparatus according to claim 1, wherein, when the at least one processor detects positions of a first user and a second user, the at least one processor detects a first reference point which corresponds to the position of the first user and a second reference point which corresponds to the position of the second user.

8. A display apparatus comprising:
   a display configured to display an image on a display target object;
   a detector configured to detect a position of a user; and
   a controller configured to determine a direction from the position of the user toward a reference point and control orientation of the image in accordance with the determined direction,
   wherein the controller is configured to determine a lower part and an upper part of the image, and control the orientation by aligning a direction from the lower part to the upper part with the direction from the position of the user toward the reference point, and
   the direction from the lower part to the upper part is in a plane parallel to the surface of the image.

9. The display apparatus according to claim 8, wherein the reference point is a point present on the display target object.

10. The display apparatus according to claim 9, wherein the reference point is a point closest to the user out of points present on the display target object.

11. The display apparatus according to claim 8, wherein the reference point is a geometric center of the display target object.

12. The display apparatus according to claim 8, wherein, when there are two users including a first user and a second user, the detector detects positions of the first and second users, the controller controls the orientation of the image in accordance with a direction from a position between the position of the first user and the position of the second user toward the reference point in a case where a distance between the position of the first user and the position of the second user is smaller than a threshold.

13. The display apparatus according to claim 8, further comprising a camera which captures a captured image of an image capturing area containing the display target object,
   wherein the detector detects a position of the reference point base on the captured image obtained from the camera.

14. The display apparatus according to claim 8, wherein, when the detector detects positions of a first user and a second user, the detector detects a first reference point which corresponds to the position of the first user and a second reference point which corresponds to the position of the second user.

15. A method for controlling a display apparatus that displays an image on a display target object, the method comprising:
   detecting a position of a user;
   determining a direction from the position of the user toward a reference point;
   controlling orientation of the image in accordance with the determined direction;
   determining a lower part and an upper part of the image; and
   controlling the orientation by aligning a direction from the lower part to the upper part with the direction from the position of the user toward the reference point,
   wherein the direction from the lower part to the upper part is in a plane parallel to the surface of the image.

16. The method according to claim 15, further comprising capturing, using a camera, a captured image of an image capturing area containing the display target object, and
   detecting a position of the reference point base on the captured image obtained from the camera.

17. The method according to claim 15, further comprising, when detecting positions of a first user and a second user, detecting a first reference point which corresponds to the position of the first user and a second reference point which corresponds to the position of the second user.

* * * * *